United States Patent
Lin et al.

(10) Patent No.: US 10,961,378 B1
(45) Date of Patent: Mar. 30, 2021

(54) ETHYLENE-VINYL ALCOHOL RESIN, FILM, AND MULTI-LAYER STRUCTURE COMPRISING THE SAME, AND METHOD FOR FORMING THE ETHYLENE-VINYL ALCOHOL RESIN

(71) Applicant: CHANG CHUN PETROCHEMICAL CO., LTD., Taipei (TW)

(72) Inventors: Wen Hsin Lin, Taipei (TW); Chih Chieh Liang, Taipei (TW); Chao Hsiang Hsu, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/726,552

(22) Filed: Dec. 24, 2019

(51) Int. Cl.
| | |
|---|---|
| *C08L 29/04* | (2006.01) |
| *C08L 23/08* | (2006.01) |
| *C08F 210/02* | (2006.01) |
| *C08F 216/06* | (2006.01) |
| *C08J 3/215* | (2006.01) |

(52) U.S. Cl.
CPC ............ *C08L 29/04* (2013.01); *C08F 210/02* (2013.01); *C08F 216/06* (2013.01); *C08J 3/215* (2013.01); *C08L 23/0846* (2013.01); *C08J 2323/08* (2013.01); *C08J 2329/04* (2013.01); *C08J 2423/08* (2013.01); *C08J 2429/04* (2013.01)

(58) Field of Classification Search
None
See application file for complete search history.

(56) References Cited

U.S. PATENT DOCUMENTS

| | | | | |
|---|---|---|---|---|
| 5,972,447 | A * | 10/1999 | Hata | B32B 27/08 |
| | | | | 428/35.7 |
| 6,503,588 | B1 | 1/2003 | Hayashi et al. | |
| 7,534,829 | B2 | 5/2009 | Tai et al. | |
| 2003/0018114 | A1* | 1/2003 | Tai | B32B 27/28 |
| | | | | 524/413 |
| 2010/0289172 | A1* | 11/2010 | Fujimura | C08J 3/215 |
| | | | | 264/148 |
| 2015/0152256 | A1 | 6/2015 | Nakazawa et al. | |

FOREIGN PATENT DOCUMENTS

| | | |
|---|---|---|
| EP | 3088431 A1 | 11/2016 |
| JP | 2001342202 A | 12/2001 |
| JP | 2018150529 A | 9/2018 |
| TW | I568563 B | 2/2017 |
| TW | 201708358 A | 3/2017 |

* cited by examiner

*Primary Examiner* — Sheeba Ahmed
(74) *Attorney, Agent, or Firm* — Polsinelli PC

(57) ABSTRACT

Ethylene-vinyl alcohol pellet(s), films, and multi-layer structure formed therefrom, as well as methods for preparing such ethylene-vinyl alcohol pellets are provided herein. The ethylene-vinyl alcohol pellets have at least two melting point temperatures and a light transmittance of greater than 8% for visible light wavelengths. The ethylene-vinyl alcohol pellet may have a haze value of less than 99.8%. One method for producing the EVOH pellet includes: obtaining a first solution comprising a first ethylene-vinyl acetate having a first ethylene content; obtaining a second solution comprising a second ethylene-vinyl acetate having a second ethylene content that is different from the first ethylene content; solution mixing; saponification; pelletizing the mixed solution to form a pellet; contacting the pellet to a boron solution; and drying the pellet.

23 Claims, 4 Drawing Sheets

ETHYLENE-VINYL ALCOHOL RESIN, FILM, AND MULTI-LAYER STRUCTURE COMPRISING THE SAME, AND METHOD FOR FORMING THE ETHYLENE-VINYL ALCOHOL RESIN

FIELD OF THE DISCLOSURE

The instant disclosure is directed ethylene-vinyl alcohol ("EVOH") resins, which can form a film that has a high uniform gas barrier. Methods for preparing such EVOH resins and forming films therefrom are also described herein.

BACKGROUND OF THE DISCLOSURE

EVOH resins are widely used in laminates for preserving perishable items. For example, EVOH resins and laminates are commonly used by the food packaging industry, medical device and supplies industry, pharmaceutical industry, electronics industry, and agricultural chemicals industry. EVOH resins are often incorporated as a distinct layer within a laminate to serve as an oxygen-barrier layer.

Laminates having a distinct EVOH layer are typically produced by coextruding EVOH with other types of polymers. EVOH resins exhibit rheological properties similar to other resins allowing it to be coextruded with polyolefins, polyamides, nylons, polystyrene, polyvinyl chloride, polyesters, and thermoplastic polyurethanes using conventional extrusion equipment. EVOH resins, however, often exhibit poor adhesion to other polymers, including, e.g., some of the above polymers. Thus, adhesive resins, called "tie resins," are used to bond the EVOH layer to an adjacent layer in co-extrusion. Some nylons and thermoplastic polyurethanes, however, will adhere directly to EVOH without the use of tie resin.

Additionally, EVOH resins having a lower ethylene content usually provide a better degree of crystallization and better gas-barrier properties, but typically provide inferior mechanical properties. Conversely, EVOH resins having a higher ethylene content usually provide better mechanical properties, but provide inferior gas-barrier properties.

To produce an EVOH pellet many processes can be used. For example, EVOH pellets are conventionally produced by a strand pelletizing process, which includes extruding a solution of dissolved EVOH copolymer/resin (or a composition thereof) into a coagulating bath through a metal plate outlet having an opening of 1 to 5 mm in diameter, or extruding a molten resin through die, and making the molten resin solidify by cooling to obtain a rod-shaped strand. The rod-shaped strand is subsequently cut at intervals of length to obtain EVOH pellets.

SUMMARY OF THE DISCLOSURE

Aspects of the instant disclosure are directed to ethylene-vinyl alcohol ("EVOH") resins, which can form a film that provides highly uniform gas barrier properties and also can form a multi-layer that provides improved gas barrier, visual appearance, and thickness deviation. Additional aspects are directed to methods for preparing such EVOH resins and forming films therefrom.

The inventors have discovered that using an EVOH resin having at least two melting point temperatures and a light transmittance of greater than 8% for visible light wavelengths can result in an EVOH resin that forms films having improved uniformity, especially with regard to gas barrier properties. Poor uniformity of a film is believed to lead to drastic decreases in the oxygen transmission rate at certain regions of the film. In addition, the inventors realized that EVOH resins that were not formed from at least two components each having a different ethylene content and exhibiting at least two distinct melting points and a light transmittance of greater than 8% for visible light wavelengths did not achieve the improved uniformity of gas barrier properties and visual appearance of the mono-layer films, multi-layer films, or thermoformed multi-layer containers described herein.

An EVOH pellet according to an aspect of the invention typically includes at least two melting point temperatures, wherein the ethylene-vinyl alcohol pellet has a light transmittance of greater than 8% for visible light wavelengths. The EVOH pellet may have a haze value of less than 99.8%.

In some instances, the difference of the at least two melting point temperatures of the EVOH pellet is about 10° C. to about 41° C. One of the at least two melting point temperatures may be in the range of 145° C. to 177° C. Additionally or alternatively, one of the at least two melting point temperatures may be in the range of 179° C. to 191° C. In at least one case, the EVOH pellet has three different melting point temperatures.

The EVOH pellet preferably has a first ethylene content and a second ethylene content, wherein the second ethylene content is different from the first ethylene content. For example, the first ethylene content may be in the range of about 20 to about 35 mole. % while the second ethylene content may be in the range of about 36 to about 65 mole. %. In at least one case, the EVOH pellet has three different ethylene contents. The EVOH pellet may also have a degree of saponification of 99.5 mole % or more. Suitable EVOH pellets may have a boron content of 30 to 250 ppm. Additionally or alternatively, the EVOH pellets may have an alkali metal content of 50 to 400 ppm.

In accordance with another aspect of the disclosure, a method for producing the EVOH pellet includes:
(a) obtaining a first solution comprising a first ethylene-vinyl acetate having a first ethylene content;
(b) obtaining a second solution comprising a second ethylene-vinyl acetate having a second ethylene content;
    wherein the second ethylene content is different from the first ethylene content,
(c) solution mixing;
(d) saponification;
(e) pelletizing the mixed solution to form a pellet;
(f) contacting the pellet to a solution containing boron and an alkali metal salt; and
(g) drying the pellet.

In some instances, the method for forming the EVOH pellet may include the foregoing steps in the following sequential order: (a), (b), (c), (d), (e), (f) to (g). In other instances, the method for forming the EVOH pellet may include the foregoing steps in the following sequential order: (a), (b), (d), (c), (e), (f) to (g). Pelletizing the mixed solution may include cooling using a cooling liquid with a temperature of less than 5° C. Preferably, the method includes using a first solution having a first ethylene content in the range of about 20 to about 34 mole. % and a second solution having a second ethylene content in the range of about 35 to about 65 mole. %.

According to a further aspect of the disclosure, provided is an EVOH film formed from the EVOH pellet disclosed herein having at least two melting point temperatures and exhibiting a light transmittance for visible light wavelengths of greater than 85% for a thickness of 20 μm. EVOH films formed from the EVOH resin preferably exhibit at least two melting points and a desirable light transmittance, in addition to the EVOH resin in the form of a pellet, when the EVOH resin is extruded to a thickness 20 µm. Additionally, the inventor(s) discovered that films formed from the EVOH resin may provide highly uniform gas barrier properties. Further, the inventors discovered that when the resin is in the form of multi-layer film/structure, the multi-layer film/structure may also provide improved gas barrier, visual appearance, and thickness deviation when the EVOH resin is in the thickness of 20 µm, has at least two melting point temperatures, and exhibits a light transmittance for visible light wavelengths of greater than 85%. The difference of the at least two melting point temperatures may be about 15° C. to about 45° C. In some instances, one of the at least two melting point temperatures is from 179° C. to 195° C. Additionally or alternatively, one of the at least two melting point temperatures may be from 142° C. to 177° C.

Preferably, the standard deviation of the oxygen transmission of the EVOH film is smaller than 4%. The EVOH film may have a haze value of less than 5%. The boron content of the ethylene-vinyl alcohol pellet may be from 30 to 250 ppm.

In accordance with yet another aspect of the disclosure, provided is a multi-layer structure having at least one layer formed from the EVOH pellets disclosed herein; at least one polymer layer; and at least one adhesive layer. The polymer layer may be chosen from a low density polyethylene layer, a polyethylene-graft-maleic-anhydride layer, a polypropylene layer, and a nylon layer. The adhesive layer may be a tie layer. Preferably, the multi-layer structure has an oxygen transmission rate of 0.021 cc/pkg*day or less after thermoforming of the multilayer structure.

BRIEF DESCRIPTION OF THE DRAWING

Implementation of the present technology will now be described, by way of example only, with reference to the attached figures, wherein.

Figure 1:
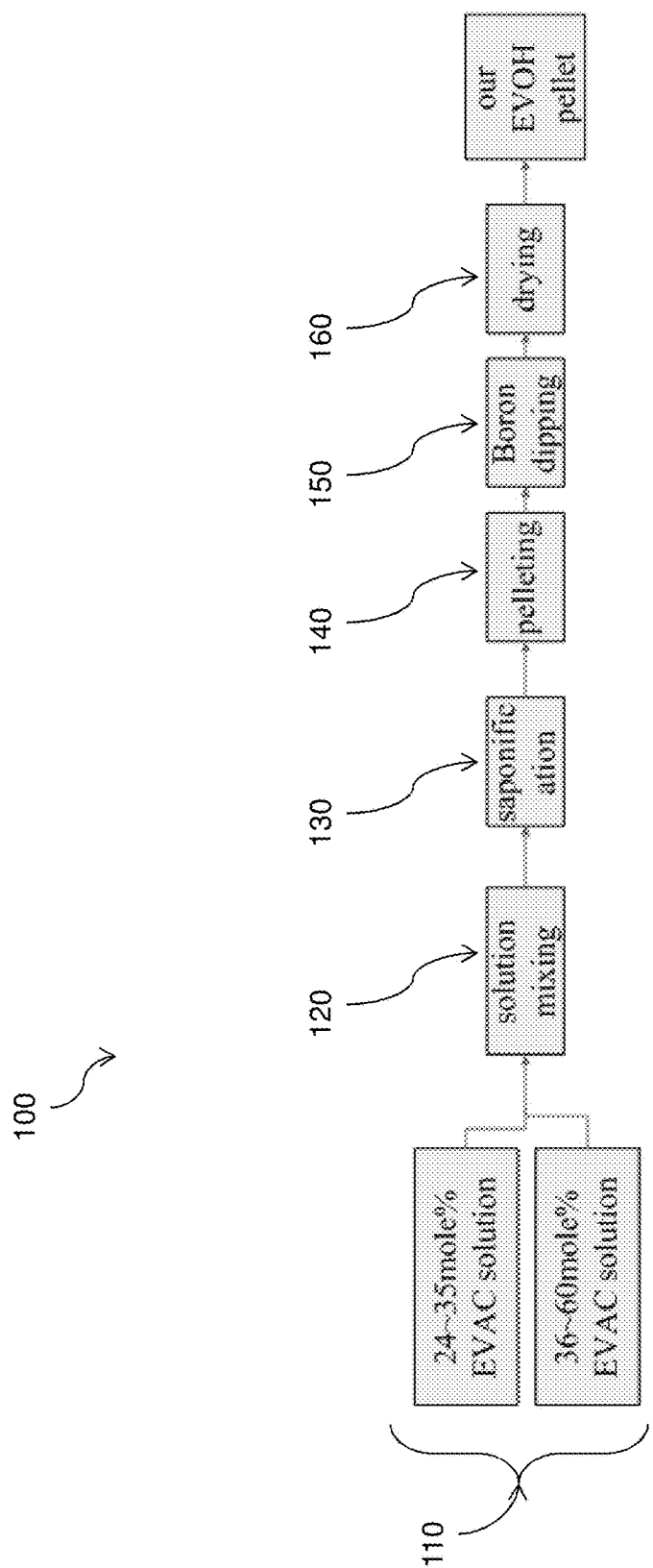
FIG. 1 is a schematic depicting a first exemplary method for preparing EVOH pellets according to an aspect of the disclosure.

It should be understood that the various aspects are not limited to the arrangements and instrumentality shown in the drawings.

DETAILED DESCRIPTION OF THE DISCLOSURE

Aspects of the instant disclosure are directed to ethylene-vinyl alcohol ("EVOH") resins, which may be in the form of pellet(s) (sometimes referred to as "EVOH pellet(s)" in this disclosure). Although an EVOH resin in the form of one or more EVOH pellet(s) is described throughout the instant disclosure, the EVOH resins may be in the form of beads, cubes, chips, shavings, or the like. Additional aspects of the disclosure are directed to EVOH films and multi-layer structure that have highly uniform gas barrier properties.

Further aspects of the disclosure are directed to methods for preparing such EVOH resins and forming films therefrom.

FIG. 1 illustrates a non-limiting, exemplary method 100 for forming the EVOH resins disclosed herein. As a brief overview, method 100 includes the steps of obtaining a first ethylene-vinyl acetate and a second ethylene-vinyl acetate; solution mixing; saponification; pelletizing the mixed solution to form a pellet; dipping the pellet into a solution containing boron and alkali metal salt; and drying the pellet.

In step 110, a first solution comprising a first ethylene-vinyl acetate ("EVAC") having a first ethylene content and a second solution comprising a second EVAC having a second ethylene content are obtained. The ethylene content of the first EVAC and/or the second EVAC is typically within the range of 20 to 65 mole %. If the ethylene content of the first EVAC and/or the second EVAC content is unduly low, the resulting film or thermoformed product may exhibit an inferior mechanical stretching property. If the ethylene unit content is unduly high, the resulting film or thermoformed product may exhibit an inferior gas-barrier property.

The first EVAC copolymer preferably has an ethylene content that is different from the second EVAC copolymer. For example, the ethylene content of the first EVAC may be in the range of about 20 to about 35 mole % while the ethylene content of the second EVAC may be in the range of about 36 to about 65 mole %. In some instances, the first EVAC may have an ethylene content of about 20 to about 34 mole %, about 22 to about 34 mole %, about 24 to about 34 mole %, about 28 to about 34 mole %; about 20 to about 32 mole %, about 22 to about 32 mole %, about 24 to about 32 mole %, about 28 to about 32 mole %; about 20 to about 30 mole %, about 22 to about 30 mole %, about 24 to about 30 mole %, or about 28 to about 30 mole %. Additionally or alternatively, the second EVAC may have an ethylene content of about 36 to about 65 mole %, about 40 to about 65 mole %, about 42 to about 65 mole %, about 44 to about 65 mole %; about 36 to about 60 mole %, about 40 to about 60 mole %, about 42 to about 60 mole %, about 44 to about 60 mole %; about 36 to about 55 mole %, about 40 to about 55 mole %, about 42 to about 55 mole %, about 44 to about 55 mole %; about 36 to about 50 mole %, about 40 to about 50 mole %, about 42 to about 50 mole %, or about 44 to about 50 mole %.

In some instances, more than two EVAC copolymers are used to prepare the EVOH resin or a pellet thereof. Each of the EVAC copolymers may have different ethylene contents. For example, the method may include obtaining three or more EVAC copolymers each having a different ethylene content to produce the EVOH resin.

In step 120, the first EVAC and the second EVAC are solution mixed. The first EVAC and the second EVAC may be raised to and/or maintained at an elevated temperature during solution mixing. In some instances, the temperature is raised to and/or maintained at a temperature of about 40° C. to about 80° C., about 50° C. to about 70° C., or about 55° C. to about 65° C. during solution mixing. One of ordinary skill would readily be able to identify and obtain procedures and conventional equipment for solution mixing the first and second EVACs together.

In step 130, the solution of the first and second EVAC undergoes saponification to form a first EVOH copolymer and a second EVOH copolymer. The first and second EVAC may be saponified using conventional methods and equipment, which one of ordinary skill would readily be able to identify and obtain. As illustrated in FIG. 1, the first and second EVAC (or a solution thereof) may undergo saponification after solution mixing. In some instances, however, each EVAC (or respective solutions thereof) may undergo saponification before solution mixing. For example, method 100 may proceed according to the sequential order of obtaining a first solution of EVAC and a second solution of EVAC, solution mixing, saponification, pelletizing the mixed solution, dipping the pellet into solution containing boron and alkali metal salt, and drying the pellet. Although method 100 as illustrated in FIG. 1 as including a saponification step 130, methods of the instant disclosure may avoid a saponification step by obtaining and solution mixing two EVOH copolymers instead of two EVAC copolymers, e.g., as show in FIG. 2.

In step 140, the first and second EVOH copolymer resin (or solution thereof) are pelletized to form EVOH pellets. The first and second EVOH copolymers, which have been solution mixed, may be pelletized using underwater pelleting or strand pelleting. Preferably, the solution of the first and second EVOH copolymers is cooled using a cooling liquid having a temperature of less than 5° C. during pelleting. In some instances the temperature of the cooling water is less than 4° C., such as less than 3.5° C., less than 3° C., less than 2.5° C., less than 2° C., or less than 1.5° C.

In step 150, the EVOH pellet(s) undergo boron dipping using a solution containing boron and an alkali metal. The EVOH pellets may be separated into particles prior to the boron dipping. Although the EVOH pellets are dipped in a bath containing a solution having boron and an alkali metal according to method 100, in some instances the EVOH pellets (or particles thereof) are washed or sprayed with a solution containing boron and an alkali metal instead of being boron dipped. The EVOH pellets or particles thereof may be boron dipped with a solution including boric acid, borax, boric oxide, sodium borate, sodium-calcium borate, calcium borate, or the like.

The solution for boron dipping may include other additives including, but not limited to, organic acids, such as acetic acid, propionic acid, butyric acid, lauric acid, stearic acid, oleic acid, and behenic acid or alkaline metal (e.g. sodium and potassium) salt, alkaline earth metal (e.g. calcium and magnesium), or zinc salt thereof; inorganic acids, such as sulfuric acid, sulfurous acid, carbonic acid, and phosphoric acid; alkaline metal (e.g. sodium and potassium) salt; alkaline earth metal (e.g. calcium and magnesium) salt, such as zinc salt and/or sodium salt thereof; or a thermostabilizer.

In step 160, the EVOH pellets are dried. Suitable processes and equipment for drying the EVOH pellets would be readily identifiable and obtainable by one of ordinary skill in the art.

Figure 2:
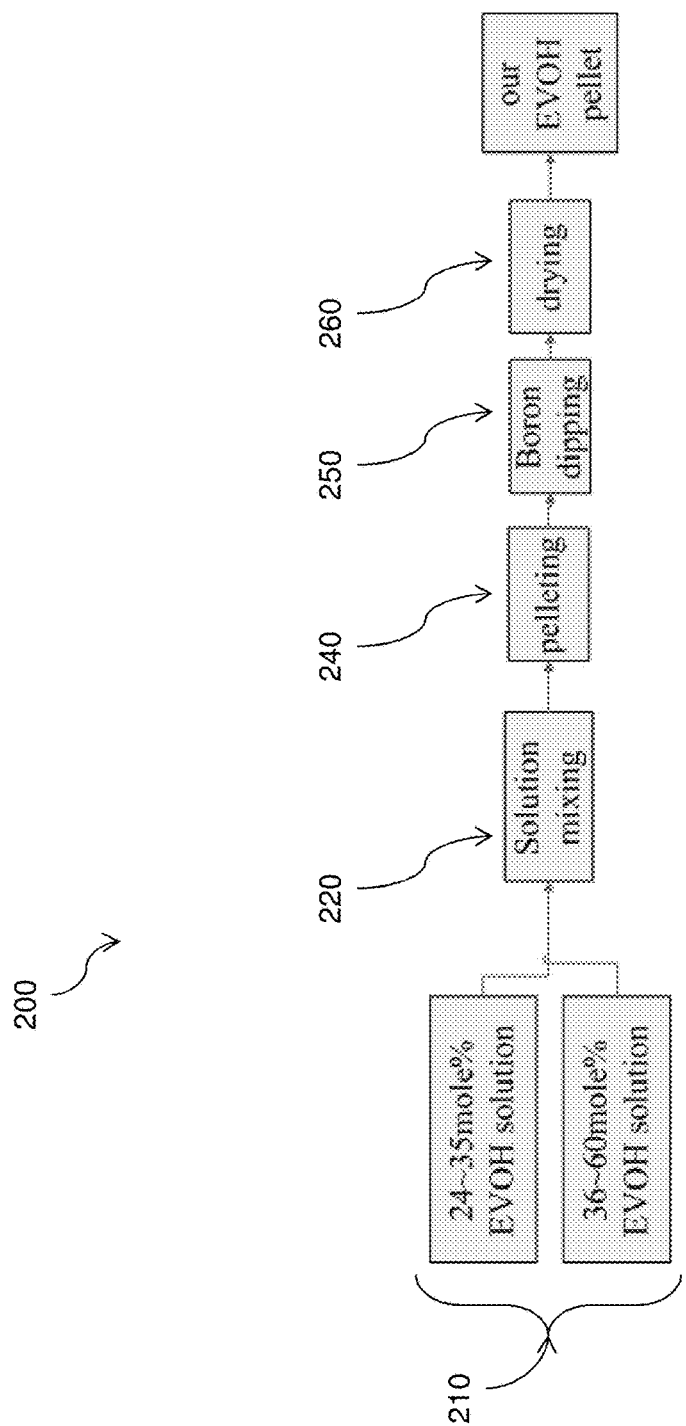
FIG. 2 is a schematic depicting a second exemplary method for preparing EVOH pellets according to an aspect of the disclosure.

FIG. 2 illustrates another non-limiting, exemplary method 200 for forming the EVOH resins disclosed herein. Method 200 is similar to method 100 except that two EVOH copolymers having different ethylene contents are obtained in step 210 instead of the two EVAC copolymers obtained in step 110. Method 200 includes a solution mixing step 220, pelleting step 240, boron dipping step 250, and drying step 260, which are similar to the steps described with respect to method 100.

In accordance with an aspect of the disclosure, provided are ethylene-vinyl alcohol ("EVOH") resins, which may be in the form of pellet(s). As used herein, EVOH pellets refer to an EVOH resin that is in the form and/or shape of one or more pellets.

The EVOH resin includes at least two melting point temperatures. In pellet form, the EVOH resin has a light transmittance of greater than 8% for visible light wavelengths. The light transmittance and haze of the EVOH pellet may be assessed by placing the EVOH pellets in a 20×36×55 mm quartz glass case, tapping the quartz glass case three times to ensure complete filling of the quartz glass case with EVOH pellets, and analyzing the light transmittance and haze with a COH-5500 device (NIPPON DENSHOKU INDUSTRIES) according to the ISO14782, ISO-13468-2-1999 method with the light transmitting in the direction parallel to the 20 mm side of quartz. For a round or ovular EVOH pellet, preferably the EVOH pellet has a long diameter of about 1.5 to about 5 mm and a short diameter of about 1.5 to about 5 mm. For a cylindrical EVOH pellet, preferably the EVOH pellet has a diameter of about 1.5 to about 3.5 mm and a length of about 2 to 5 mm. For a round or ovular EVOH pellet, the maximum outer diameter of a pellet is taken as a long diameter and a maximum diameter in a cross section having the greatest area among cross sections perpendicular to the long diameter is taken as a short diameter. For a cylindrical EVOH pellet, the greatest length perpendicular to the cross section is taken as a length and a maximum diameter in a cross section is taken as a long diameter. Based on the above method for determining transmittance, the EVOH pellet preferably has a transmittance of greater than 8%, such as 8.1% or more, 8.5% or more, 9.0% or more, or 9.1% or more. Additionally or alternatively, the EVOH pellet preferably has a haze value determined based on the diffuse transmittance divided by the total light transmittance, as determined using the above method, of less than 99.8%, such as 99.6% or less, or 99.5% or less.

Without being limited to any specific theories, it is believed that an EVOH pellet having a preferable light transmittance, such as those discussed above, may be obtained when: the pelleting of the EVOH resin includes using cooling water having a temperature of 5° C. or less; the EVOH pellets have a boron content of 30 to 250 ppm; and the EVOH pellet have a alkali metal content of 50 to 400 ppm. Additionally, the inventors realized that the more times the EVOH pellet was melted, the light transmittance became worse, such that in some instances it is preferable to not melt the EVOH resin or pellets thereof by heat processes more than once. In some instances, method 100 excludes pelletizing by compounding and/or compounding of two distinct EVOH resins/pellets.

The EVOH resin or pellets thereof have at least two melting point temperatures typically ranging from about 145° C. to about 191° C. Preferably, one of the at least two melting point temperatures of the EVOH resin is in the range of about 145° C. to about 177° C., e.g., 145° C. to about 175° C. or 148° C. to about 172° C. Additionally or alternatively, one of the at least two melting point temperatures of the EVOH resin is preferably in the range of 179° C. to 191° C., e.g., 181° C. to 189° C. or 183° C. to 187° C. In some instances, the EVOH resins have at least three different melting point temperatures. In other instances, the EVOH resin includes at least four, at least five, or at least six different melting point temperatures.

The difference of the at least two melting point temperatures is preferably in the range of about 10° C. to about 41° C., e.g., about 15° C. to about 35° C., or about 18° C. to about 32° C. Without being limited to a specific theory, the inventors discovered that when the difference between the at least two melting point temperatures is out of the foregoing preferable ranges, the ethylene contents of the EVOH copolymers forming the EVOH resin or pellet thereof are too different, which may result in poor miscibility and/or result in inferior characteristics for a thermoformed multi-layer formed therefrom. For example, if the ethylene contents of the EVOH copolymers forming the EVOH resin or pellet thereof are too close, multi-layer structures thermoformed from the EVOH resin or EVOH pellet may have inferior characteristics.

The EVOH resins are typically formed of at least a first EVOH copolymer having a first ethylene content and a second EVOH copolymers having a second ethylene content, where the second ethylene content is different from the first ethylene content. For example, the first ethylene may be in the range of about 20 to about 35 mole % and the second ethylene content may be in the range of about 36 to about 65 mole %. In some instances, the first ethylene content ranges from about 20 to about 35 mole %, about 22 to about 35 mole %, about 24 to about 35 mole %, about 28 to about 35 mole %; about 20 to about 34 mole %, about 22 to about 34 mole %, about 24 to about 34 mole %, about 28 to about 34 mole %; about 20 to about 32 mole %, about 22 to about 32 mole %, about 24 to about 32 mole %, about 28 to about 32 mole %; about 20 to about 30 mole %, about 22 to about 30 mole %, about 24 to about 30 mole %, or about 28 to about 30 mole %. Additionally or alternatively, the second ethylene content of the EVOH resin may be about 36 to about 65 mole %, about 40 to about 65 mole %, about 42 to about 65 mole %, about 44 to about 65 mole %; about 36 to about 60 mole %, about 40 to about 60 mole %, about 42 to about 60 mole %, about 44 to about 60 mole %; about 36 to about 55 mole %, about 40 to about 55 mole %, about 42 to about 55 mole %, about 44 to about 55 mole %; about 36 to about 50 mole %, about 40 to about 50 mole %, about 42 to about 50 mole %, or about 44 to about 50 mole %.

In some instances, the EVOH resins have a boron content of 30 to 250 ppm. For example, the boron content of the EVOH resins may range from 50 to 200 ppm or 60 to 230 ppm. The EVOH resins may be formulated to have an amount of boron content that reduces the amount of crystallized structure within the EVOH resin or pellet formed therefrom. Additionally, the EVOH resin may have an amount of alkali metal ranging from 50 to 400 ppm. In some instances, the amount of alkali metal present in the EVOH resin is from about 50 to about 380 ppm, about 80 to about 370 ppm, about 140 to about 360 ppm, about 250 to about 350 ppm, about 260 to about 340 ppm, about 270 to about 330 ppm, about 280 to about 320 ppm, or about 290 to about 310 ppm.

According to a further aspect of the disclosure, provided is an EVOH film formed from an EVOH resin, such as the EVOH resins disclosed herein, having at least two melting point temperatures and exhibiting a light transmittance of greater than 85% for visible light wavelengths. The EVOH film may be formed from the EVOH resins disclosed herein using conventional processes and equipment, such as an extruder.

Preferably, the EVOH film may have a light transmittance, as determined using the method of ISO 14782, ISO-13468-2-1999 with COH-5500 (NIPPON DENSHOKU INDUSTRIES), that is 86% or more, 87% or more, 88% or more, 89% or more, 90% or more, 91% or more, or 92% or more. Additionally or alternatively, the EVOH film may have a haze value determined based on the diffuse transmittance divided by the total light transmittance of less than 5%, e.g., less than 4.5%, less than 4.0%, less than 3.5%, less than 3.0%, less than 2.5%, less than 2.0%, or less than 1.5%.

The EVOH film may have at least two melting point temperatures typically ranging from about 142° C. to about 195° C. Preferably, one of the at least two melting point temperatures of the EVOH resin is from about 142° C. to about 177° C., e.g., 145° C. to about 175° C. or 148° C. to about 172° C. Additionally or alternatively, one of the at least two melting point temperatures of the EVOH resin is preferably from 179° C. to 195° C., e.g., 181° C. to 192° C. or 183° C. to 189° C. In some instances, the EVOH films have at least three different melting point temperatures. In other instances, the EVOH film includes at least four, at least five, or at least six different melting point temperatures.

The difference of the at least two melting point temperatures of the EVOH film is preferably from about 15° C. to about 45° C., e.g., about 17° C. to about 44° C. or about 20° C. to about 40° C. The inventors discovered that forming an EVOH film having at least two melting point temperatures with a difference between the at least two melting point temperatures of about 15° C. to about 45° C. may provide an EVOH film having a high uniformity of gas barrier properties.

The EVOH film preferably has a gas barrier property that is highly uniform over the entire EVOH film. For example, the EVOH film may have a gas barrier property that is within a standard deviation of less than 4%, less than 3.5%, less than 3%, less than 2.5%, or less than 2%, over entire EVOH film (e.g., as measured at three or more different locations). The gas barrier properties of the EVOH film are assessed by determining the oxygen transmission rate (OTR) through such film. The gas barrier property of the EVOH film, as well as the standard deviation thereof, may be determined from at least three locations using the method of ISO 14663-2 with a mocon OXTRAN 2/22 device.

In accordance with yet a further aspect of the disclosure, provided is a multi-layer structure having at least one layer formed from an EVOH resin, such as the EVOH resins disclosed herein. The multi-layer structure also include at least one polymer layer; and at least one adhesive layer.

The polymer layer may be chosen from a low density polyethylene layer, a polyethylene-graft-maleic-anhydride layer, a polypropylene layer, and a nylon layer. The adhesive layer may be a tie layer.

Preferably, the multi-layer structure has an oxygen transmission rate of 0.021 cc/pkg*day or less, as measured by the method of ISO 14663-2 with a mocon OXTRAN 2/22 device at 65% relative humidity and 23° C., after thermoforming of the multilayer structure. In some instances, the multi-layer structure has an oxygen transmission rate of 0.018 cc/pkg*day or less, 0.015 cc/pkg*day or less, 0.012 cc/pkg*day or less, 0.009 cc/pkg*day or less, or 0.006 cc/pkg*day or less.

EXAMPLES

The following non-limiting examples are provided primarily for the purposes of elucidating the benefits and properties achieved by aspects of the invention.

Example 1

Preparation of Formulations

Exemplary and comparative ethylene-vinyl alcohol ("EVOH") formulations were prepared to elucidate certain benefits of the invention. Each of the exemplary and comparative EVOH formulations were prepared from at least two components. The at least two components of the exemplary and comparative formulations were either EVOH polymers or ethylene-vinyl acetate ("EVAC") polymers.

Exemplary Formulations A-C were each prepared from two EVAC components with different ethylene contents.

Exemplary Formulation D was prepared from three EVAC components, each having a different ethylene content. Exemplary Formulations E and F were each prepared from two EVOH compositions with different ethylene contents.

Similarly, Comparative Formulations G, H, and J-L were each prepared from two EVAC compositions with different ethylene contents. Comparative Formulation I was prepared from two EVOH compositions with different ethylene contents. Comparative Formulation M was prepared from dry blending of two EVOH pellets having two different ethylene contents. The ethylene content of the components used for preparing each of the Exemplary Formulations A-F and Comparative Formulations G-M is provided below in Table 1.

TABLE 1

|  | $1^{st}$ Component Ethylene Content (mole %) | $2^{nd}$ Component Ethylene Content (mole %) | $3^{rd}$ Component Ethylene Content (mole %) | Ratio of $1^{st}$ Comp. to $2^{nd}$ Comp. to $3^{rd}$ Comp. ($1^{st}$: $2^{nd}$:$3^{rd}$) |
|---|---|---|---|---|
| Exemplary Formulation A | 32% | 44% | — | 50:50 |
| Exemplary Formulation B | 32% | 60% | — | 75:25 |
| Exemplary Formulation C | 24% | 36% | — | 90:10 |
| Exemplary Formulation D | 29% | 48% | 60% | 70:5:25 |
| Exemplary Formulation E | 24% | 48% | — | 55:45 |
| Exemplary Formulation F | 35% | 60% | — | 60:40 |
| Comparative Formulation G | 24% | 75% | — | 75:25 |
| Comparative Formulation H | 32% | 38% | — | 75:25 |
| Comparative Formulation I | 32% | 44% | — | 75:25 |
| Comparative Formulation J | 29% | 44% | — | 90:10 |
| Comparative Formulation K | 32% | 44% | — | 50:50 |
| Comparative Formulation L | 32% | 48% | — | 75:25 |
| Comparative Formulation M | 32% | 48% | — | 75:25 75 25 |

EVOH pellets were produced from each of the exemplary and comparative formulations (Exemplary Formulations A-F and Comparative Formulations G-M) shown in Table 1 of Example 1.

Production of EVOH Resin for Exemplary Formulation A

For Exemplary Formulation A, the two components (EVAC polymers) were formed by polymerizing ethylene and vinyl acetate monomers. The two components were combined by solution mixing and subsequently saponified to form EVOH.

The EVOH was dissolved into an aqueous alcohol solution of methanol and water, having a methanol to water ratio of 60:40. The EVOH/methanol/water solution was maintained a temperature of 60° C. for one hour to promote the EVOH dissolving in the EVOH/methanol/water solution. The EVOH/methanol/water solution had a solid content of 41 wt. %.

The EVOH/methanol/water solution was pumped to a feeding tube with a 120 L/min flow rate and then passed to an inlet pipe having a diameter of 2.8 mm. The EVOH was cut by a rotating knife, which was rotating at 1,500 rpm, as the pellet was cooled by adding water having a temperature of 1.5° C., thereby forming the EVOH pellet through underwater pelletizing. The EVOH pellet was centrifuged to separate EVOH particles. The separated EVOH particles were washed with water and then immersed into a boron/sodium acetate solution, and subsequently dried to obtain the final product of an EVOH pellet. The final product of EVOH pellet included a boron content of 62 ppm, an alkali metal content of about 50 ppm and a long diameter of 3 mm and a short diameter 2.4 mm in a round shape.

Production of EVOH Resin for Exemplary Formulation B

An EVOH pellet was produced for Exemplary Formulation B, according to the formulation shown in Table 1, using a procedure similar to that used to produce the EVOH pellet of Exemplary Formulation A. However, for the production of the EVOH pellet of Exemplary Formulations B, the cooling water temperature was set as 2.5° C. The EVOH pellet of Exemplary Formulations B had a boron content of 85 ppm, alkali metal content of about 78 ppm and a long diameter of 3 mm and a short diameter of 2.4 mm in a round shape.

Production of EVOH Pellet for Exemplary Formulations C

An EVOH pellet was produced for Exemplary Formulation C, according to the formulation shown in Table 1, using a procedure similar to that used to produce the EVOH pellet of Exemplary Formulation A. However, to produce the EVOH pellet for Exemplary Formulation C, the EVOH/methanol/water solution was pumped to a feeding tube with a 60 L/min flow rate and then passed to an inlet pipe having a diameter of 2.5 mm. The EVOH was cut by a rotating knife, which was rotating at 1,000 rpm, as the pellet was cooled by adding water having a temperature of 0.5° C., thereby forming the EVOH pellet through strand cutting. The EVOH pellet of Exemplary Formulation C included a boron content of 113 ppm, alkali metal content of about 140 ppm and a diameter of 1.5 mm and a length of 5 mm with a cylindrical shape.

Production of EVOH Pellet for Exemplary Formulation D

An EVOH pellet was produced for Exemplary Formulation D, according to the formulation shown in Table 1, using a procedure similar to that used to produce the EVOH pellet of Exemplary Formulation A. However, in this case, the cooling water temperature was set as 0.3° C. The final product of EVOH pellet included a boron content as 248 ppm, alkali metal content of about 400 ppm, and a long diameter of 3 mm and a short diameter 2.4 mm in a round shape.

Production of EVOH Pellet for Exemplary Formulation E

To produce the EVOH pellet of Exemplary Formulation E, the two components (EVAC polymers) were formed by polymerizing ethylene and vinyl acetate monomers. The two components were separately saponified to form EVOH polymers. In contrast to the process for producing the EVOH of Exemplary Formulations A-D, the two components were not combined using solution mixing prior to saponification.

After saponification, the EVOH polymers were dissolved into two separate aqueous alcohol solutions of methanol and water, having a methanol to water ratio of 60:40. The two EVOH/methanol/water solutions each had a solid content of 41 wt. %. Subsequently, the EVOH/methanol/water solutions were combined by solution mixing and maintained at a temperature of 60° C. for one hour.

The EVOH/methanol/water solution was pumped to a feeding tube with a 60 L/min flow rate and then passed to an inlet pipe having a diameter of 2.5 mm. The EVOH was cut by a rotating knife, which was rotating at 1,000 rpm, as the pellet was cooled by adding water having a temperature of 3° C., thereby pelletizing by strand cutting to form an EVOH pellet. The EVOH pellet was centrifuged to separate EVOH particles. The separated EVOH particles were washed with water and then immersed into a boron/sodium acetate solution, and subsequently dried to obtain the final product of an EVOH pellet. The final product of EVOH pellet included a boron content of 30 ppm, an alkali metal content of about 264 ppm, and a diameter of 1.5 mm and a length of 5 mm with a cylindrical shape.

Production of EVOH Pellet for Exemplary Formulation F

An EVOH pellet was produced for Exemplary Formulation F, according to the formulation shown in Table 1, using a procedure similar to that used to produce the EVOH pellet of Exemplary Formulation E. However, to produce the EVOH pellet of Exemplary Formulation F, the EVOH/methanol/water solution was pumped to a feeding tube with a 120 L/min flow rate and then passed to an inlet pipe having a diameter of 2.8 mm. The EVOH was cut by a rotating knife, which was rotating at 1,500 rpm, as the pellet was cooled by adding water having a temperature of 2.1° C., thereby forming the EVOH pellet through underwater pelletizing. The EVOH pellet of Exemplary Formulation F included a boron content of 90 ppm, alkali metal content of about 345 ppm, and a long diameter of 3 mm and a short diameter of 2.4 mm in a round shape.

Production of EVOH Pellet for Comparative Formulations G

An EVOH pellet was produced for Exemplary Formulation G, according to the formulation shown in Table 1, using a procedure similar to that used to produce the EVOH pellet of Exemplary Formulation A. However, to produce the EVOH pellet for Exemplary Formulation G, the cooling water temperature was set as 1.8° C. The EVOH pellet included a boron content of 78 ppm, an alkali metal content of about 254 ppm, and a long diameter of 3 mm and a short diameter of 2.4 mm in a round shape.

Production of EVOH Pellet for Comparative Formulations H

An EVOH pellet was produced for Exemplary Formulation H, according to the formulation shown in Table 1, using a procedure similar to that used to produce the EVOH pellet of Exemplary Formulation A. However, to produce the EVOH pellet for Comparative Formulations H, the cooling water temperature was set as 1.7° C. The EVOH pellet included a boron content of 173 ppm, an alkali metal content of about 170 ppm, and a long diameter of 3 mm and a short diameter of 2.4 mm in a round shape.

Production of EVOH Pellet for Comparative Formulation I

To produce an EVOH pellet for Comparative Formulation I, the two components (EVAC polymers) were formed by polymerizing ethylene and vinyl acetate monomers. The two components were separately saponified to form EVOH polymers. After saponification, the EVOH polymers were dissolved into two separate aqueous alcohol solutions of methanol and water, having a methanol to water ratio of 70:30. The two EVOH/Methanol/water solutions each had a solid content of solution of 41 wt. %. Subsequently, the two EVOH/Methanol/water solutions were maintained a temperature of 60° C. for one hour.

The two EVOH/Methanol/water solutions were separately pumped to a feeding tube with a 60 L/min flow rate and then passed to an inlet pipe having a diameter of 2.5 mm. The two EVOH solutions were separately cut by a rotating knife, which was rotating at 1,000 rpm, as the pellets were cooled by adding water having a temperature of 2.2° C., thereby forming distinct EVOH pellets for each the two EVOH solutions. The EVOH pellets formed from the two EVOH solutions were centrifuged to separate EVOH particles, which were separately washed with water and then immersed into a boron/sodium acetate solution and subsequently dried to obtain two distinctive EVOH pellets.

The EVOH pellets formed from the two EVOH solutions were compounded by a twin screw extruded with a screw rotation speed of 100 rpm and a cylinder temperature of 205° C., and pelletized by strain cutting to obtain the final EVOH pellet of Comparative Formulation I. The process of compounding the two distinctive EVOH pellets included melting and mixing the two distinctive EVOH pellets. The final EVOH pellets included a boron content of 215 ppm, an alkali metal content of about 450 ppm, and a diameter of 1.5 mm and a length of 5 mm in a cylindrical shape.

Production of EVOH Pellet for Comparative Formulation J

An EVOH pellet for Comparative Formulation J was produced using a process similar to that used to produce the EVOH pellet of Exemplary Formulation A, except that the EVOH of Comparative Formulation J was cooled with water having a temperature of 0.9° C. and was compounded after formation of the boron immersed EVOH pellet. Specifically, after forming the EVOH/methanol/water solution, the EVOH/methanol/water solution was pumped to a feeding tube with a 60 L/min flow rate and then passed to an inlet pipe having a diameter of 2.5 mm. The EVOH was cut by a rotating knife, which was rotating at 1,000 rpm, as the pellet was cooled by adding water having a temperature of 0.9° C., thereby forming the EVOH pellet. The EVOH pellet was centrifuged to separate EVOH particles. The separated EVOH particles were washed with water and then immersed into a boron/sodium acetate solution, and subsequently dried to obtain an EVOH pellet of Comparative Formulation J.

The EVOH pellet was subsequently compounded using a compounding machine with a screw rotation speed of 100 rpm and a cylinder temperature of 205° C. Strand cutting was employed to obtain the final product of EVOH pellet. The obtained EVOH pellet included a boron content of 163 ppm, an alkali metal content of about 340 ppm, and a diameter of 1.5 mm and a length of 5 mm in a cylindrical shape.

Production of EVOH Pellet of Comparative Formulation K

An EVOH pellet for Comparative Formulation K was produced using a process similar to that used to produce the EVOH pellet of Exemplary Formulation A, except that Comparative Formulation K was not immersed into a boron/sodium acetate solution. Specifically, after the EVOH pellet of Comparative Formulation K was produced, the EVOH pellet was centrifuged to separate EVOH particles. The separated EVOH particles were washed with water, and subsequently dried to obtain the final EVOH pellet of Comparative Formulation K. The obtained EVOH pellet included a boron content of 0 ppm, an alkali metal content of about 0 ppm, and a diameter of circular in 1.5 mm and a length of 5 mm in a cylindrical shape.

Production of Comparative Formulation L

An EVOH pellet for Comparative Formulation L was produced using a process used similar to that used to produce the EVOH pellet of Exemplary Formulations A, except that Comparative Formulation L was immersed in cooling water with a temperature of 5° C. Specifically, after the EVOH pellet of Comparative Formulation L was produced, the EVOH pellet was centrifuged to separate EVOH particles. The separated EVOH particles were washed with water, and subsequently dried to obtain the final product of an EVOH pellet of Comparative Formulation L. The EVOH pellet included a boron content of 80 ppm, an alkali metal content of about 274 ppm, and a long diameter of 3 mm and a short diameter 2.4 mm with a round shape.

Production of Comparative Formulation M

To produce an EVOH pellet for Comparative Formulation M, the two components (EVAC polymers) were formed by polymerizing ethylene and vinyl acetate monomers. The two components were separately saponified to form EVOH polymers. After saponification, the EVOH polymers were dissolved into two separate aqueous alcohol solutions of methanol and water, having a methanol to water ratio of 70:30. The two EVOH/Methanol/water solutions each had a solid content of solution of 41 wt. %. Subsequently, the two EVOH/Methanol/water solutions were maintained a temperature of 60° C. for one hour.

The two EVOH/Methanol/water solutions were separately pumped to a feeding tube with a 120 L/min flow rate and then passed to an inlet pipe having a diameter of 2.8 mm. The two EVOH solutions were separately cut by a rotating knife, which was rotating at 1,500 rpm, as the EVOH reached a cooled temperature of 1.8° C., thereby forming distinct EVOH pellets from the two EVOH solutions. The EVOH pellets formed from the two EVOH solutions were centrifuged to separate EVOH particles, which were separately washed with water and then immersed into a boron solution/sodium acetate solution and subsequently dried to obtain distinct EVOH pellets. The two EVOH pellets were dry blended using a blending machine to form the final product of an EVOH pellet of Comparative Formulation M. The obtained EVOH pellet included a boron content of 125 ppm, an alkali metal content of about 356 ppm, and a long diameter of 3 mm and a short diameter 2.4 mm with a round shape.

Example 2

Production of Mono-Layer, Multi-Layer Film, and Multi-Layer Structure

Mono-layer films and multi-layer films were formed from each of the EVOH pellets of Exemplary Formulations A-F and Comparative Formulations G-M. The mono-layer films (Exemplary Films A1-F1 and Comparative Films G1-M1) were produced by feeding the EVOH pellets of Exemplary Formulations A-F and Comparative Formulations G-M into a single layer T-die cast film extruder (Optical Control System MEV4). Exemplary Films A1-F1 and Comparative Films G1-M1 had a thickness of 20 µm. The extruder was set at a temperature of 220° C., the die was set at a temperature of 230° C. and the screw rotational frequency was 7 rpm.

Multi-layer films were formed from each of the EVOH pellets of Exemplary Formulations A-F and Comparative Formulations G-M by co-extruding the respective EVOH pellets, polypropylene, and a tie layer (e.g., ARKEMA OREVAC 18729). The multilayer films (Exemplary Films A2-F2 and Comparative Films G2-M2) had 5 layers with the EVOH layer sandwiched between two polypropylene layers. Tie layers were disposed between each side of the EVOH layer and one of the polypropylene layers. Specifically, EVOH pellet (I), polypropylene (II), and adhesive resin (III) were fed into a five layer co-extruder to produce a multi-layer sheet having a structure represented by: (II)/(III)/(I)/(III)/(II), with thicknesses of 300/25/50/25/300 (µm), respectively.

Figure 4:
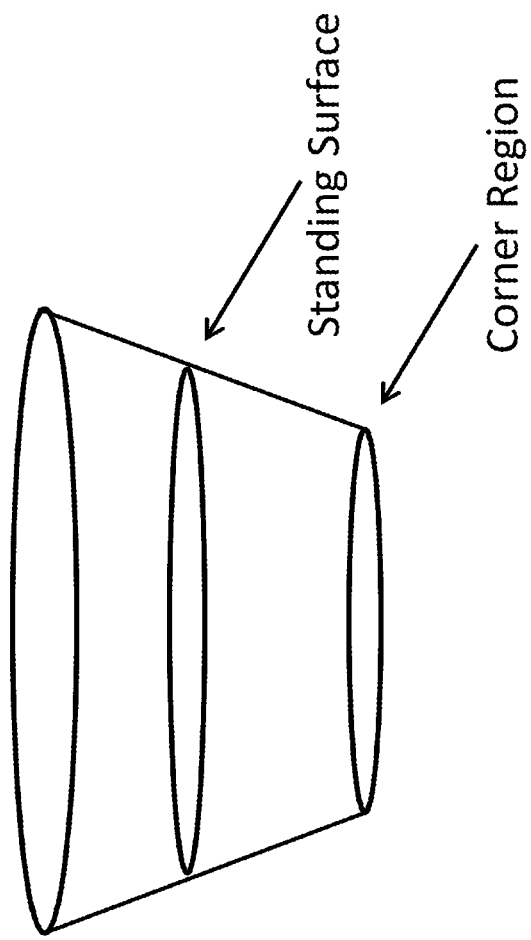
FIG. 4 is an image of an exemplary thermoformed multi-layer container with the standing surface region and corner surface region demarcated.

A multi-layer container was obtained by thermoforming Exemplary Films A2-F2 and Comparative Films G2-M2 into the shape of a container (e.g., a cup and/or cup-shaped container, such as a fruit cup). The multi-layer containers of Exemplary Films A2-F2 and Comparative Films G2-M2 were then cut with a knife and the thickness of the EVOH layer was measured at a standing surface region and at a corner surface region. FIG. 4 is an image of an exemplary thermoformed multi-layer container with the standing surface region and corner surface region demarcated.

Example 3

Ascertainment of Chemical and Physical Properties

The EVOH pellets formed from Exemplary Formulations A-F and Comparative Formulations G-M as well as the mono-layer films (Exemplary Films A1-F1 and Comparative Films G1-M1), multi-layer films (Exemplary Films A2-F2 and Comparative Films G2-M2), and multi-layer structures (as formed into an exemplary container shape) formed from the EVOH pellets were analyzed to determine various chemical and physical properties, including the gas barrier properties before and after thermoforming, the melting point temperature(s), the total light transmittance, and the boron content. The gas barrier properties of Exemplary Films A1-F1 and Comparative Films G1-M1 and Exemplary Films A2-F2 and Comparative Films G2-M2 were assessed by determining the oxygen transmission rate (OTR) through such films. The OTR for the each of Exemplary Films A1-F1 and Comparative Films G1-M1 was determined at three different locations using the method of ISO 14663-2 with a mocon OXTRAN 2/22 device. The OTR testing was carried out at 65% relative humidity at 23° C. The OTR standard deviation was calculated using the difference between the OTR at the three locations. The OTR was also determined for Exemplary Films A2-F2 and Comparative Films G2-M2 using the method of ISO 14663-2 with a mocon OXTRAN 2/22 device at 65% relative humidity and 23° C.

The melting point temperature(s) of the EVOH pellets of Exemplary Formulations A-F and Comparative Formulations G-M were determined using the method of ISO 11357-3-2011 with a DSC Q200 device (The Tzero lid was a TA Instrument T 170607 and the Tzero pan was a TA Instrument T 170620). The melting point of Exemplary Films A1-F1 and Comparative Films G1-M1 was also determined using the same method.

As mentioned above, the total light transmittance of the EVOH pellets of Exemplary Formulations A-F and Comparative Formulations G-M and Exemplary Films A1-F1 and Comparative Films G1-M1 was analyzed using the method of ISO 14782, ISO-13468-2-1999 with COH-5500 (NIPPON DENSHOKU INDUSTRIES) devices. The amount of haze of the EVOH pellets was determined based on the diffuse transmittance divided by the total light transmittance. Specifically, to determine the total light transmittance and haze of the EVOH pellets, the EVOH pellets were placed in a 20×36×55 mm quartz glass case and the quartz glass case was tapped three times to ensure that the quartz glass case was completely filed with EVOH pellets. The total light transmittance and haze was analyzed with a COH-5500 device (NIPPON DENSHOKU INDUSTRIES) according to the ISO14782, ISO-13468-2-1999 method with the light transmitting in the direction parallel to the 20 mm side of quartz glass case. If the EVOH pellet(s) was round or ovular, the long diameter and short diameter was used for determining total light transmittance and haze. If the EVOH pellet(s) were cylindrical, the long diameter and the length were used for determining total light transmittance and haze. For a round or ovular EVOH pellet, the maximum outer diameter of the EVOH pellet(s) was taken as a long diameter and the maximum diameter in a cross section having the greatest area among cross sections perpendicular to the long diameter was taken as the short diameter. For a cylindrical EVOH pellet, the greatest length perpendicular to the cross section was taken as the length, and the maximum diameter in a cross section was taken as the long diameter.

The boron content of the EVOH pellets for Exemplary Formulations A-F and Comparative Formulations G-M was also determined. A sample solution was formed from the EVOH pellets by breaking down samples of the EVOH pellets using concentrated nitric acid and a microwave. The sample solution was then diluted with pure water to adjust the concentration of the sample solution to 0.75 mg/ml. The amount of boron contained in the sample solution was measured using an ICP emission spectrochemical analysis device (ICP-OES) (analyzer: Thermo iCAP7000). The boron amount was a measurement value corresponding to the amount of boron derived from the boron compound used.

The visual attributes of the thermoformed multi-layer containers Exemplary Films A2-F2 and Comparative Films G2-M2 were assessed. Specifically, the difference in the thickness of the EVOH layer at the corner region was compared to the thickness of the EVOH layer at the standing region was determined for each of the thermoformed multi-layer containers.

Table 2, provided below, shows the results of the analysis of the melting point temperature(s), the total light transmittance, and the haze of each of the EVOH pellets. Table 3 shows the results of the melting point temperature, gas barrier property, the light transmittance, and the haze of the mono-layer films Exemplary Films A1-F1 and Comparative Films G1-M1. Table 4 shows the results of the analysis of the gas barrier property of the multi-layer films Exemplary Films A2-F2 and Comparative Films G2-M2 as well as the visual appearance of the containers thermoformed therefrom.

TABLE 2

| | $1^{st}$ $T_{Melt}$ (C. °) | $2^{nd}$ $T_{Melt}$ (C. °) | $3^{rd}$ $T_{Melt}$ (C. °) | $\Delta T_{Melt}$ (C. °) | Light Transmittance | Haze (%) |
|---|---|---|---|---|---|---|
| Exemplary Formulation A | 1800 | 169° | — | 11° | 9.06 | 99.56 |
| Exemplary Formulation B | 181° | 143° | — | 38° | 9.12 | 99.45 |
| Exemplary Formulation C | 191° | 177° | — | 14° | 9.18 | 99.67 |
| Exemplary Formulation D | 186° | 162° | 145° | 41° | 8.14 | 99.75 |
| Exemplary Formulation E | 191° | 162° | — | 29° | 9.15 | 99 |
| Exemplary Formulation F | 179° | 145° | — | 34° | 9.24 | 99.65 |
| Comparative Formulation G | 193° | 121° | — | 72° | 7.62 | 99.87 |
| Comparative Formulation H | 180° | — | — | — | 9.13 | 99.78 |
| Comparative Formulation I | 183° | 165° | — | 18° | 5.24 | 99.81 |
| Comparative Formulation J | 188° | 164° | — | 24° | 5.23 | 99.81 |
| Comparative Formulation K | 181° | 168° | — | 13° | 7.82 | 99.82 |
| Comparative Formulation L | 181° | 162° | — | 19° | 6.89 | 99.85 |
| Comparative Formulation M | 183° or 162° | — | — | 21° | 9.17 | 98.91 |

TABLE 3

| | $1^{st}$ $T_{Melt}$ (C. °) | $2^{nd}$ $T_{Melt}$ (C. °) | $3^{rd}$ $T_{Melt}$ (C. °) | $\Delta T_{Melt}$ (C. °) | Light Transmittance | Haze (%) | OTR at 3 location of mono-layer film | OTR Standard Deviation |
|---|---|---|---|---|---|---|---|---|
| Exemplary Film A1 | 181° | 164° | — | 17° | 92.2% | 2.03 | 0.51/0.46/0.53 | 0.036 |
| Exemplary Film B1 | 182° | 143° | — | 39° | 86.7% | 1.58 | 0.52/0.54/0.48 | 0.03 |
| Exemplary Film C1 | 195° | 177° | — | 18° | 92.3% | 3.24 | 0.7/0.72/0.68 | 0.02 |
| Exemplary Film D1 | 186° | 160° | 142° | 44° | 87.5% | 4.35 | 0.52/0.49/0.49 | 0.017 |
| Exemplary Film E1 | 195° | 159° | — | 36° | 89.7% | 3.45 | 0.54/0.47/0.49 | 0.036 |

TABLE 3-continued

| | $1^{st}$ $T_{Melt}$ (C. °) | $2^{nd}$ $T_{Melt}$ (C. °) | $3^{rd}$ $T_{Melt}$ (C. °) | $\Delta T_{Melt}$ (C. °) | Light Transmittance | Haze (%) | OTR at 3 location of mono-layer film | OTR Standard Deviation |
|---|---|---|---|---|---|---|---|---|
| Exemplary Film F1 | 179° | 142° | — | 37° | 89.6% | 3.21 | 0.73/0.72/0.76 | 0.02 |
| Comparative Film G1 | 195° | 118° | — | 77° | 83.2% | 5.43 | 0.62/0.78/0.54 | 0.122 |
| Comparative Film H1 | 180° | — | — | — | 91.3% | 3.45 | 0.32/0.35/0.41 | 0.046 |
| Comparative Film I1 | 183° | 164° | — | 19° | 80.3% | 7.32 | 0.32/0.58/0.79 | 0.235 |
| Comparative Film J1 | 189° | 164° | — | 25° | 81.2% | 6.54 | 0.35/0.54/0.23 | 0.156 |
| Comparative Film K1 | 181° | 164° | — | 17° | 84.3% | 6.7 | 0.51/0.64/0.43 | 0.105 |
| Comparative Film L1 | 181° | 162° | — | 19° | 83.5% | 5.18 | 0.53/0.24/0.45 | 0.11 |
| Comparative Film M1 | 183° or 159° | | — | 24° | 83.4% | 6.21 | 0.31/0.67/1.2 | 0.447 |

TABLE 4

| | Thickness Deviation | Visual Appearance | OTR of multi-layer film |
|---|---|---|---|
| Exemplary Film A2 | ○ | ○ | 0.0065 |
| Exemplary Film B2 | ○ | ○ | 0.0078 |
| Exemplary Film C2 | ○ | ○ | 0.0052 |
| Exemplary Film D2 | Δ | ○ | 0.012 |
| Exemplary Film E2 | Δ | ○ | 0.021 |
| Exemplary Film F2 | ○ | ○ | 0.015 |
| Comparative Film G2 | X | X | 1.08 |
| Comparative Film H2 | X | X | 1.12 |
| Comparative Film I2 | X | X | 0.85 |
| Comparative Film J2 | X | X | 0.54 |
| Comparative Film K2 | Δ | X | 0.15 |
| Comparative Film L2 | Δ | X | 0.17 |
| Comparative Film M2 | X | X | 0.98 |

The column heading of "Thickness Deviation" refers to the difference in the thickness of the EVOH layer in thermoformed multi-layer container at the corner region as compared to the standing region, which was produced from the multi-layer films of Exemplary Films A2-F2 and Comparative Films G2-M2. A "○" was given to EVOH layers having a thickness that differed between the corner region and the standing region by less than 20%. A "Δ" was given to EVOH layers having a thickness that differed between the corner region and the standing region by 20% to 40%. An "X" was given to EVOH layers having a thickness that differed between the corner region and the standing region by more than 40%.

The column heading of "Visual Appearance" refers to the visual assessment of the thermoformed containers formed from the multi-layer films of Exemplary Films A2-F2 and Comparative Films G2-M2. A "○" was given to containers that did not have a pitted surface based on a visual assessment. An "X" was given to containers that had a pitted surface based on a visual assessment.

Figure 3:
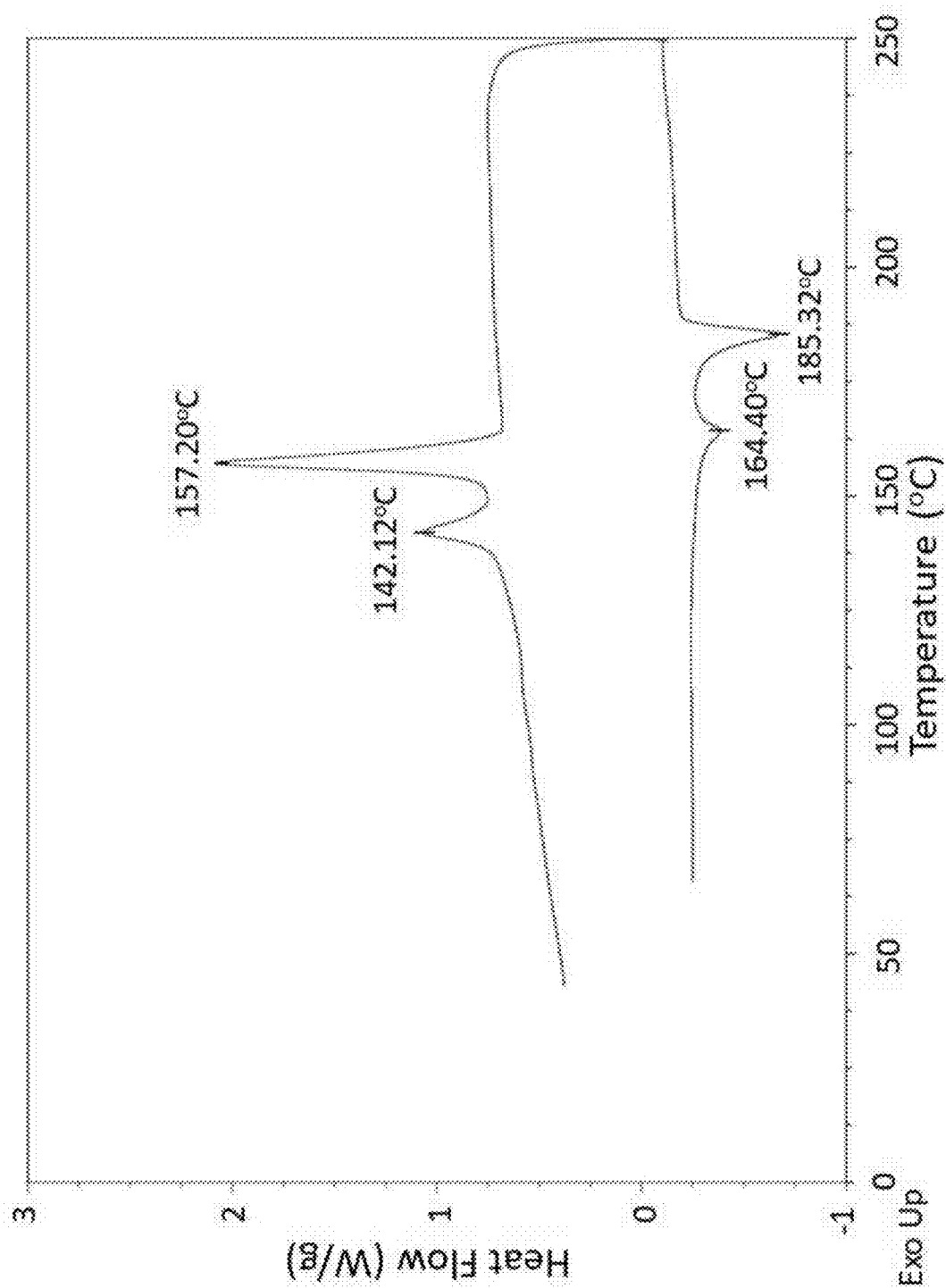
FIG. 3 is a graph of the two melting point temperatures of an exemplary EVOH resin according to aspects of the disclosure.

As shown by Table 2, the EVOH pellets of Exemplary Formulations A-F each exhibited at least two distinct melting point temperatures. Without being bound by any particular theory, it is believe that the EVOH pellets of Comparative Formulation H exhibited only one melting point temperature because the two components each had a melting point temperature that was very close to each other. FIG. 3 is an exemplary graph showing an EVOH pellet having two melting point temperatures.

The EVOH pellet of Comparative Formulation G had a difference in the melting point temperatures of 72° C., which was outside of the desired range of 10 to 41° C. Without being limited to any specific theory, the inventors ascribe at least the inferior appearance and the undesirable difference in the thickness of the EVOH layer of the thermoformed multi-layer container of Comparative Film G2 to the difference in the melting point temperatures of the EVOH pellet of Comparative Formulation G being outside the aforementioned desired range.

The EVOH pellet of Comparative Formulation H did not exhibit two distinct melting point temperatures. It is believed that at least the inferior appearance and the undesirable difference in the thickness of the EVOH layer in the thermoformed container formed from Comparative Film H2 is due to the EVOH pellet of Comparative Formulation H not exhibiting two distinct melting point temperatures.

The mono-layer film Comparative Film G1 had melting point temperatures with the difference of the melting point temperatures being out of range and exhibited an inferior light transmittance value. The thermoformed multi-layer container of Comparative Film G2 exhibited an inferior appearance and undesirable difference in the thickness of the EVOH layer in the thermoformed multi-layer container between the corner region and the standing region.

The mono-layer film Comparative Film H1 exhibited only one melting temperature. The thermoformed multi-layer container of Comparative Film H2 exhibited an inferior appearance and undesirable difference in the thickness of the EVOH layer in the thermoformed multi-layer container between the corner region and the standing region.

The mono-layer film Comparative Film I1 exhibited an inferior light transmittance value. The thermoformed multi-layer container of Comparative Film I2 exhibited an inferior appearance and undesirable difference in the thickness of the EVOH layer in the thermoformed multi-layer container between the corner region and the standing region.

Similarly Comparative Film J1 exhibited an inferior light transmittance value and the thermoformed multi-layer container of Comparative Film J2 exhibited an inferior appearance and undesirable difference in the thickness of the EVOH layer between the corner region and the standing region.

Comparative Film K1 exhibited an inferior light transmittance and an inferior visual appearance. The inferior visual appearance of Comparative Film K1 may be attributable to crystallization effects in the EVOH pellet of Comparative Formulation K. The EVOH pellet of Comparative Formulation K did not undergo boron dipping.

Comparative Film L1 exhibited an inferior light transmittance and the thermoformed multi-layer container of Comparative Film L2 exhibited an undesirable visual appearance.

Comparative Film M1 exhibited an inferior light transmittance value while thermoformed multi-layer container M2 exhibited an inferior appearance and undesirable difference in the thickness of the EVOH layer between the corner region and the standing region. The EVOH pellet(s) formed of Comparative Formulation M were produced by way of dry blending. Two distinctive EVOH pellets were formed from Comparative Formulation M, each with a mono (although different) melting point temperature.

Additionally, the mono-layer films of Exemplary Films A1-F1 exhibited surprisingly superior uniform gas barrier properties as compared to the Comparative Films. Specifically, the mono-layer films of Exemplary Films A1-F1 exhibited an OTR standard deviation that was unexpectedly better than the OTR standard deviation of Comparative Films. For example, the average OTR standard deviation exhibited by Exemplary Films A1-F1 was 0.0265, while the average OTR standard deviation exhibited by Comparative Formulations G-M was 0.174, which is about 656% larger than the average OTR standard deviation exhibited by Exemplary Films A1-F1.

The multi-layer films of Exemplary Films A2-F2 also exhibited surprisingly superior gas barrier properties as compared to Comparative Films G2-M2. For example, the average OTR exhibited by the Comparative Films G2-M2 was about 6,200% larger than the average OTR exhibited by multi-layer films of Exemplary Films A2-F2.

Example 4

Investigation of Total Light Transmittance and Haze

Additional EVOH pellets were formed from Exemplary Formulations A and C to further investigate the attributes affecting the total light transmittance and haze of EVOH pellets. Specifically, the method for producing the EVOH pellets of Exemplary Formulation A (discussed above in Example 1) was varied to produce three distinct sets of EVOH pellets (EVOH pellet A-1, EVOH pellet A-2, and EVOH pellet A-3). The method for blending the two EVAC copolymers of Exemplary Formulation A was EVAC solution blending and each set of EVOH pellets formed therefrom was pelletized by underwater pelletization.

The method for producing EVOH pellets of Exemplary Formulation C (discussed above in Example 1) was also varied to produce four distinct sets of EVOH pellets (EVOH pellet C-1, EVOH pellet C-2, EVOH pellet C-3, and EVOH pellet C-4). The two EVAC copolymers of Exemplary Formulation C were mixed by EVAC solution blending and each set of EVOH pellets formed therefrom was pelletized by strand cutting.

The parameters for producing the distinct sets of EVOH pellets from Exemplary Formulations A and C are shown in Table 5, below. In particular, the volumetric flow for pumping the EVOH/methanol/water solutions into a feed tube, the diameter of the inlet pipe, and the speed of the rotating knife used to pelletize and produce each set of EVOH pellets are provided in Table 5.

TABLE 5

| | Feeding (L/min) | Inlet pipe diameter (mm) | Rotating knife speed (rpm) |
|---|---|---|---|
| EVOH pellet A-1 | 120 | 2.8 | 1500 |
| EVOH pellet A-2 | 60 | 2.5 | 3000 |
| EVOH pellet A-3 | 240 | 3.2 | 1000 |
| EVOH pellet C-1 | 60 | 2.5 | 1000 |
| EVOH pellet C-2 | 60 | 2.5 | 1800 |
| EVOH pellet C-3 | 90 | 2.8 | 1000 |
| EVOH pellet C-4 | 90 | 2.8 | 1800 |

Each set of EVOH pellets was analyzed using the method of ISO 14782, ISO-13468-2-1999 with COH-5500 (NIPPON DENSHOKU INDUSTRIES) devices. As discussed above, the amount of haze of the EVOH pellets was determined based on the diffuse transmittance divided by the total light transmittance. Specifically, to determine the total light transmittance and haze, the EVOH pellets were placed in a 20×36×55 mm quartz glass case and the quartz glass case was tapped three times to ensure that the quartz glass case was completely filed with EVOH pellets. The total light transmittance and haze was analyzed with a COH-5500 device (NIPPON DENSHOKU INDUSTRIES) according to the ISO14782, ISO-13468-2-1999 method with the light transmitting in the direction parallel to the 20 mm side of quartz glass case. If the EVOH pellet(s) was round or ovular, the long diameter and short diameter was used for determining total light transmittance and haze. If the EVOH pellet(s) were cylindrical, the long diameter and the length were used for determining total light transmittance and haze. The maximum outer diameter of the EVOH pellet(s) was taken as a long diameter and the maximum diameter in a cross section having the greatest area among cross sections perpendicular to the long diameter was taken as the short diameter.

Table 6 provides the shape, the long diameter or diameter, and the short diameter or length of each set of EVOH pellets. Additionally, the total light transmittance for each set of EVOH pellets is provided in Table 6, below.

TABLE 6

| | Shape of EVOH pellets | Long Diameter or Diameter (mm) | Short Diameter or Length (mm) | Total Light Transmittance (%) |
|---|---|---|---|---|
| EVOH pellet A-1 | Round | 3 | 2.4 | 9.06 |
| EVOH pellet A-2 | Round | 1.5 | 1.5 | 9.16 |
| EVOH pellet A-3 | Round | 5 | 5 | 9.08 |
| EVOH pellet C-1 | Cylindrical | 1.5 | 5 | 9.18 |
| EVOH pellet C-2 | Cylindrical | 1.5 | 3.5 | 9.12 |
| EVOH pellet C-3 | Cylindrical | 2 | 5 | 9.15 |
| EVOH pellet C-4 | Cylindrical | 2 | 3.5 | 9.17 |

Surprisingly, each set of EVOH pellets for Exemplary Formulations A and C exhibited an advantageous amount of total light transmittance although each set had different sizes and shapes. For example, the EVOH pellets formed from Exemplary Formulation A exhibited light transmittances of 9.06 to 9.16. The EVOH pellets formed from Exemplary Formulation C exhibited light transmittances of 9.12 to 9.18. Although EVOH pellets A-1, EVOH pellets A-2, and EVOH pellets A-3 were all round pellets, the light transmittance of such EVOH pellets overlapped the range of light transmittances of EVOH pellets C-1, EVOH pellets C-2, EVOH pellets C-3, and EVOH pellets C-4, which were all cylindrical pellets. Moreover, changing the diameters or length of the EVOH pellets did not significantly affect the light transmittances of the EVOH pellets, which advantageously further enables the production of EVOH pellets having different sizes and shapes.

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4 and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol resin in the form of a pellet comprising:
   two melting point temperatures, wherein the difference of the two melting point temperatures is about 10° C. to about 41° C.; the ethylene-vinyl alcohol resin has a light transmittance of greater than 8% for visible light wavelengths; a boron content of the ethylene-vinyl alcohol pellet that is 30 to 250 ppm; and an alkali metal content of the ethylene-vinyl alcohol pellet is from 50 to 400 ppm.

2. The ethylene-vinyl alcohol resin in the form of the pellet of claim 1 having a haze value of less than 99.8%.

3. The ethylene-vinyl alcohol resin in the form of the pellet of claim 1 having a first ethylene content and a second ethylene content, the second ethylene content being different from the first ethylene content.

4. The ethylene-vinyl alcohol resin in the form of the pellet of claim 1, wherein one of the at least two melting point temperatures is from 145° C. to 177° C.

5. The ethylene-vinyl alcohol resin in the form of the pellet of claim 1, wherein one of the at least two melting point temperatures is from 179° C. to 191° C.

6. The ethylene-vinyl alcohol resin in the form of the pellet of claim 1, wherein the degree of saponification is 99.5 mole % or more.

7. The ethylene-vinyl alcohol resin in the form of the pellet of claim 3, wherein the first ethylene content is in the range of about 20 to about 35 mole % and the second ethylene content is in the range of about 36 to about 65 mole %.

8. The ethylene-vinyl alcohol resin in the form of the pellet of claim 1, wherein the ethylene-vinyl alcohol pellet comprises solely two melting point temperatures.

9. An ethylene-vinyl alcohol resin consisting of:
   two or more ethylene-vinyl alcohol copolymers;
   optionally, a boron content of 30 to 250 ppm;
   optionally, an alkali metal content of 50 to 400 ppm;
   wherein the ethylene-vinyl alcohol resin has at least two melting point temperatures,
   wherein the difference of the at least two melting point temperatures is about 15° C. to about 45° C. and the ethylene-vinyl alcohol resin has a light transmittance for visible light wavelengths of greater than 85% for a thickness of 20 μm.

10. The ethylene-vinyl alcohol resin of claim 9 having a haze value of less than 5%.

11. The ethylene-vinyl alcohol resin of claim 9 having a boron content of 30 to 250 ppm.

12. The ethylene-vinyl alcohol resin of claim 9, wherein one of the at least two melting point temperatures is from 179° C. to 195° C.

13. The ethylene-vinyl alcohol resin of claim 9, wherein one of the at least two melting point temperatures is from 142° C. to 177° C.

14. The ethylene-vinyl alcohol resin of claim 9, wherein the standard deviation of oxygen transmission is smaller than 4%.

15. A multi-layer structure comprising:
   (a) at least one layer formed from the ethylene-vinyl alcohol resin of claim 1;
   (b) at least one polymer layer; and
   (c) at least one adhesive layer.

16. The multi-layer structure of claim 15, wherein the polymer layer is selected from the group consisting of a low density polyethylene layer, a polyethylene-graft-maleic-anhydride layer, a polypropylene layer, and a nylon layer.

17. The multi-layer structure of claim 15, wherein the adhesive layer is a tie layer.

18. The multi-layer structure of claim 15 having an oxygen transmission rate of 0.021 cc/pkg*day or less after thermoforming of the multilayer structure.

19. A method for forming the ethylene-vinyl alcohol resin of claim 1, comprising the step of:
   (a) obtaining a first solution comprising a first ethylene-vinyl acetate having a first ethylene content;
   (b) obtaining a second solution comprising a second ethylene-vinyl acetate having a second ethylene content; wherein the second ethylene content is different from the first ethylene content,
   (c) solution mixing;
   (d) saponification;
   (e) pelletizing the mixed solution to form one or more pellet(s);
   (f) contacting the one or more pellet(s) to a solution containing boron and aka metal salt; and
   (g) drying the pellet.

20. The method of claim 19, wherein the sequence of steps is (a), (b), (c), (d), (e), (f) to (g).

21. The method of claim 19, wherein the sequence of steps is (a), (b), (d), (c), (e), (f) to (g).

22. The method of claim 19, wherein pelletizing the mixed solution includes cooling using a cooling liquid having a temperature of less than 5° C.

23. The method of claim 19, wherein the first ethylene content is in the range of about 20 to about 35 wt% and the second ethylene content is in the range of about 36 to about 65 wt.%.

* * * * *